United States Patent
Wu et al.

(10) Patent No.: US 11,804,059 B2
(45) Date of Patent: Oct. 31, 2023

(54) PEDESTRIAN RE-IDENTIFICATION METHOD AND APPARATUS

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Jiangxu Wu, Beijing (CN); Weihua Zhang, Beijing (CN); Hongguang Zhang, Beijing (CN); Ganglin Peng, Beijing (CN); Leifeng Kong, Beijing (CN); Yuefeng Wu, Beijing (CN); Xinghui Yong, Beijing (CN); Fan Li, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 493 days.

(21) Appl. No.: 17/044,578

(22) PCT Filed: Apr. 26, 2019

(86) PCT No.: PCT/CN2019/084489
§ 371 (c)(1),
(2) Date: Oct. 1, 2020

(87) PCT Pub. No.: WO2019/206265
PCT Pub. Date: Oct. 31, 2019

(65) Prior Publication Data
US 2021/0201009 A1 Jul. 1, 2021

(30) Foreign Application Priority Data
Apr. 26, 2018 (CN) .......................... 201810383810.8

(51) Int. Cl.
G06V 40/10 (2022.01)
G06V 20/40 (2022.01)
(Continued)

(52) U.S. Cl.
CPC ............ *G06V 40/103* (2022.01); *G06F 18/22* (2023.01); *G06F 18/23* (2023.01); *G06V 10/762* (2022.01);
(Continued)

(58) Field of Classification Search
None
See application file for complete search history.

(56) References Cited

U.S. PATENT DOCUMENTS

2016/0092739 A1   3/2016 Oami et al.
2016/0180196 A1*  6/2016 Taylor .................... G06V 20/52
                                                  382/103
(Continued)

FOREIGN PATENT DOCUMENTS

CN   107153817 A   9/2017
CN   107153824 A   9/2017

OTHER PUBLICATIONS

International Search Report dated Jul. 31, 2019 in PCT/CN2019/084489 (with English translation), 5 pages.
(Continued)

*Primary Examiner* — Chan S Park
*Assistant Examiner* — Elisa M Rice
(74) *Attorney, Agent, or Firm* — Oblon, McClelland, Maier & Neustadt, L.L.P.

(57) ABSTRACT

The present disclosure provides a pedestrian re-identification method and apparatus. The pedestrian re-identification apparatus detects a pedestrian to be identified in a specified video frame, and within a specified time period before the capture time of the specified video frame, extracts all
(Continued)

pedestrians appearing in the captured video frame and taking them to be historical pedestrians; calculating the feature distances between the pedestrian to be identified and the historical pedestrians; in order of feature distance, from small to large, extracting historical pedestrian identifications corresponding to a predetermined number of feature distances, and clustering the extracted historical pedestrian identifications so as to re-identify the pedestrians to be identified. The present disclosure effectively suppresses external noise interference and improves the success rate of pedestrian re-identification.

11 Claims, 4 Drawing Sheets

(51) Int. Cl.
  *G06F 18/22*   (2023.01)
  *G06F 18/23*   (2023.01)
  *G06V 10/762*  (2022.01)
  *G06V 20/52*   (2022.01)
  *G06V 10/62*   (2022.01)
(52) U.S. Cl.
  CPC .............. *G06V 20/46* (2022.01); *G06V 20/52* (2022.01); *G06V 10/62* (2022.01)

(56) References Cited

U.S. PATENT DOCUMENTS

| | | |
|---|---|---|
| 2018/0060647 A1 | 3/2018 | Tsuboshita et al. |
| 2018/0204093 A1* | 7/2018 | Zhu ..................... G06V 10/762 |
| 2020/0034630 A1 | 1/2020 | Oami et al. |

OTHER PUBLICATIONS

Written Opinion of the International Searching Authority dated Jul. 31, 2019 in PCT/CN2019/084489, (with English translation), 6 pages.

Extended European Search Report dated Nov. 18, 2021 in European Patent Application No. 19792513.4, 10 pages.

Le An, et al., "Person Reidentification with Reference Descriptor" IEEE Transactions on Circuits and Systems for Video Technology, IEEE, USA, XP011604988, vol. 26, No. 4, Apr. 1, 2016, pp. 776-787.

Liang Zheng, et al., "Person Re-identification in the Wild" 2017 IEEE Conference on Computer Vision and Pattern Recognition (CVPR), IEEE Computer Society, US, XP033249683, Jul. 21, 2017, pp. 3346-3355.

* cited by examiner

PEDESTRIAN RE-IDENTIFICATION METHOD AND APPARATUS

CROSS-REFERENCE TO RELATED APPLICATIONS

The present application is a U.S. National Stage Application under 35 U.S.C. § 371 of International Patent Application No. PCT/CN2019/084489, filed on Apr. 26, 2019, which is based on and claims priority from CN application No. 201810383810.8, filed on Apr. 26, 2018, the disclosure of both of which are hereby incorporated into this disclosure by reference in its entirety.

TECHNICAL FIELD

The present disclosure relates to the field of image recognition, and in particular, to a method and an apparatus for re-identifying a pedestrian.

BACKGROUND

The Pedestrian Re-identification (Re-ID) technology is to track a trajectory of a pedestrian by utilizing the images of the same pedestrian acquired by the same camera in different time periods and the images of the same pedestrian acquired by different cameras.

SUMMARY

According to a first aspect of the embodiments of the present disclosure, there is provided a pedestrian re-identification method, comprising: detecting a pedestrian to be identified in a preset video frame; extracting all pedestrians appearing in video frames shot in a preset time period before a shooting time of the preset video frame as historical pedestrians, wherein an end time of the preset time period is the shooting time of the preset video frame; calculating a feature distance between the pedestrian to be identified and each historical pedestrian of the historical pedestrians; extracting historical pedestrian IDs corresponding to a preset number of the feature distances in ascending order of the feature distances; and clustering the historical pedestrian IDs to re-identify the pedestrian to be identified.

In some embodiments, the clustering the historical pedestrian IDs comprises: clustering the historical pedestrian IDs to classify same historical pedestrian IDs into a same cluster set; counting a number of historical pedestrian IDs in each cluster set; and taking a historical pedestrian ID in a cluster set with the maximum number of historical pedestrian IDs as an ID of the pedestrian to be identified.

In some embodiments, the pedestrian re-identification method further comprising: calculating an average value of the feature distances corresponding to each historical pedestrian ID in the preset number of feature distances after re-identifying the pedestrian to be identified; judging whether the average value of the feature distances corresponding to the ID of the pedestrian to be identified is a minimum value according to a calculating result; and determining the ID of the pedestrian to be identified is matched with the pedestrian to be identified under a condition that the average value of the feature distances corresponding to the ID of the pedestrian to be identified is the minimum value.

In some embodiments, the pedestrian re-identification method further comprising: increasing a value of the preset number under a condition that the average value of the feature distances corresponding to the ID of the pedestrian to be identified is not the minimum value; judging whether a current value of the preset number is greater than a first threshold; and executing a step of extracting the historical pedestrian IDs corresponding to the preset number of the feature distances in ascending order of the feature distances under a condition that the current value of the preset number is not larger than the first threshold.

In some embodiments, the pedestrian re-identification method further comprising: assigning a new historical pedestrian ID to the pedestrian to be identified under a condition that the current value of the preset number is greater than the first threshold.

In some embodiments, the pedestrian re-identification method further comprising: counting a number of feature distances corresponding to the each historical pedestrian ID after calculating a feature distance between the pedestrian to be identified and the each historical pedestrian of the historical pedestrians; judging whether a counting result exceeds a second threshold; deleting a maximum feature distance in the feature distances corresponding to the each historical pedestrian ID under a condition that the counting result exceeds the second threshold; and executing a step of extracting historical pedestrian IDs corresponding to a preset number of the feature distances in ascending order of the feature distances.

According to a second aspect of the embodiments of the present disclosure, there is provided a pedestrian re-identification apparatus comprising: a processor; and a memory coupled to the processor, storing program instructions which, when executed by the processor, cause the processor to: detect a pedestrian to be identified in a preset video frame; extract all pedestrians appearing in video frames shot in a preset time period before a shooting time of the preset video frame as historical pedestrians, wherein an end time of the preset time period is the shooting time of the preset video frame; calculate a feature distance between the pedestrian to be identified and each historical pedestrian of the historical pedestrians; extract historical pedestrian IDs corresponding to a preset number of the feature distances in ascending order of the feature distances; and cluster the historical pedestrian IDs to re-identify the pedestrian to be identified.

In some embodiments, the instructions further cause the processor to: cluster the historical pedestrian IDs to classify same historical pedestrian IDs into a same cluster set; count a number of historical pedestrian IDs in each cluster set; and take a historical pedestrian ID in a cluster set with the maximum number of historical pedestrian IDs as an ID of the pedestrian to be identified.

In some embodiments, the instructions further cause the processor to: calculate an average value of the feature distances corresponding to each historical pedestrian ID in the preset number of feature distances after re-identifying the pedestrian to be identified; judge whether the average value of the feature distances corresponding to the ID of the pedestrian to be identified is a minimum value according to a calculating result; and determine the ID of the pedestrian to be identified is matched with the pedestrian to be identified under a condition that the average value of the feature distances corresponding to the ID of the pedestrian to be identified is the minimum value.

In some embodiments, the instructions further cause the processor to: increase a value of the preset number under a condition that the average value of the feature distances corresponding to the ID of the pedestrian to be identified is not the minimum value; judge whether a current value of the preset number is greater than a first threshold; and execute a step of extracting the historical pedestrian IDs corresponding to the preset number of the feature distances in ascending order of the feature distances under a condition that the current value of the preset number is not larger than the first threshold.

In some embodiments, the instructions further cause the processor to: assign a new historical pedestrian ID to the pedestrian to be identified under a condition that the current value of the preset number is greater than the first threshold.

In some embodiments, the instructions further cause the processor to: count a number of feature distances corresponding to the each historical pedestrian ID after calculating a feature distance between the pedestrian to be identified and the each historical pedestrian of the historical pedestrians; judge whether a counting result exceeds a second threshold; delete a maximum feature distance in the feature distances corresponding to the each historical pedestrian ID under a condition that the counting result exceeds the second threshold; and execute a step of extracting historical pedestrian IDs corresponding to a preset number of the feature distances in ascending order of the feature distances.

According to a third aspect of the embodiments of the present disclosure, there is provided a non-transitory computer-readable storage medium, where the computer-readable storage medium stores computer instructions which, when executed by a processor, implement the method according to any one of the embodiments described above.

Other features of the present disclosure and advantages thereof will become apparent from the following detailed description of exemplary embodiments thereof, which proceeds with reference to the accompanying drawings.

BRIEF DESCRIPTION OF THE DRAWINGS

In order to more clearly illustrate the embodiments of the present disclosure or the technical solutions in the prior art, the drawings used in the embodiments or the description of the prior art will be briefly described below. It is obvious that the drawings in the following description are only some embodiments of the present disclosure, and for those skilled in the art, other drawings may be obtained according to the drawings without paying inventive effort.

DETAILED DESCRIPTION

Figure 1:
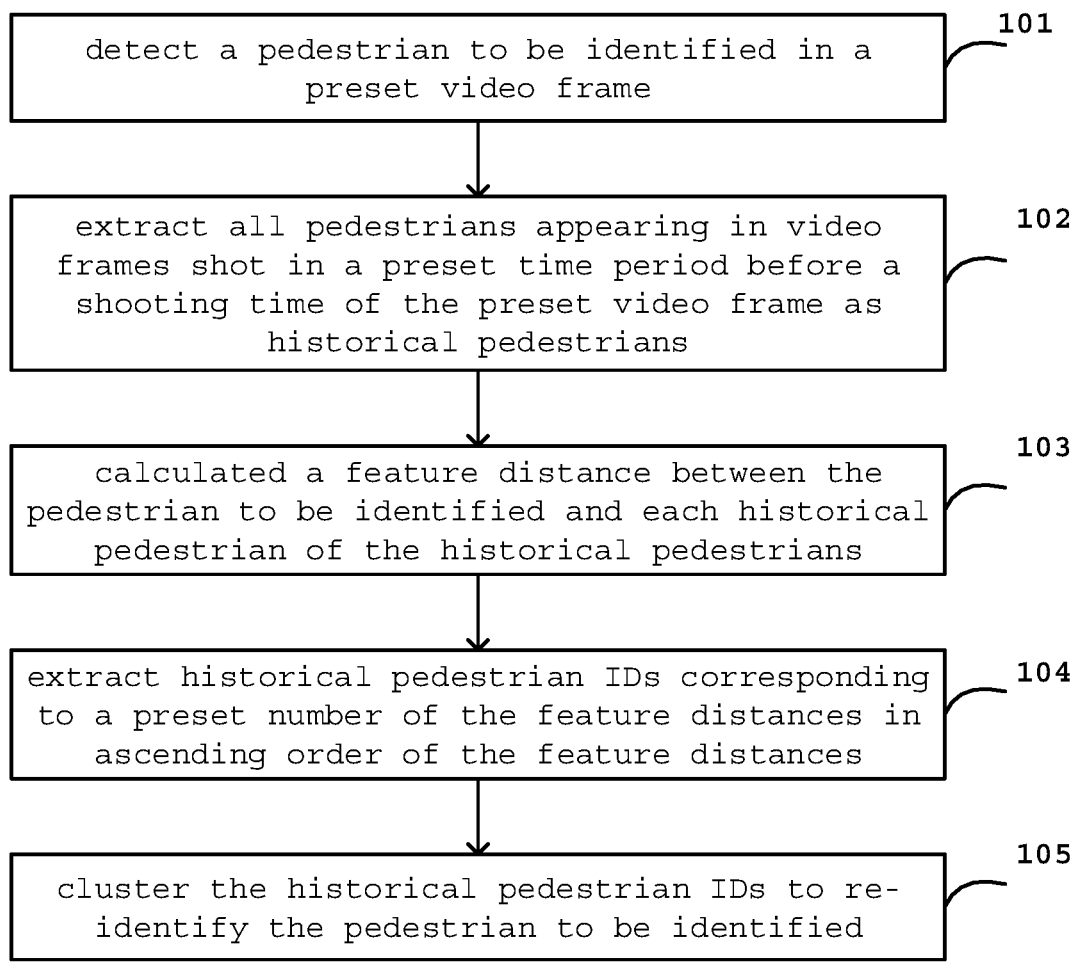
FIG. 1 is an exemplary flowchart of a pedestrian re-identification method according to one embodiment of the present disclosure.

The technical solutions in the embodiments of the present disclosure will be described clearly and completely with reference to the drawings in the embodiments of the present disclosure, and it is obvious that the embodiments described are only some, rather than all, of the embodiments of the present disclosure. The following description of at least one exemplary embodiment is merely illustrative in nature and is in no way intended to limit the disclosure, its application, or uses. All other embodiments, which can be derived by a person skilled in the art from the embodiments disclosed herein without inventive step, are intended to be within the scope of the present disclosure.

The relative arrangement of parts and steps, numerical expressions and numerical values set forth in these embodiments do not limit the scope of the present disclosure unless specifically stated otherwise.

Meanwhile, it should be understood that the sizes of the respective portions shown in the drawings are not drawn in an actual proportional relationship for the convenience of description.

Techniques, methods, and apparatus known to one of ordinary skill in the relevant art may not be discussed in detail but are intended to be part of the specification where appropriate.

In all examples shown and discussed herein, any particular value should be construed as exemplary only and not as limiting. Thus, other examples of the exemplary embodiments may have different values.

It should be noted that: similar reference numbers and letters refer to similar items in the following figures, and thus, once an item is defined in one figure, it need not be discussed further in subsequent figures.

The inventors found through research that, a pedestrian re-identification scheme based on appearance characteristics of a pedestrian is highly affected by factors such as the posture of the pedestrian, an illumination condition and a shooting angle, and finally causing a failure of the pedestrian re-identification. In related art, it is determined whether a pedestrian is the pedestrian who appears repeatedly by using feature extraction and feature distances. Firstly, features of the pedestrian to be identified in a current video frame are extracted, and pedestrians appearing in video frames within 2 minutes before the shooting time of the current video frame are regarded as historical pedestrians. A feature distance between the pedestrian to be identified and each of the historical pedestrians is calculated, and the pedestrian to be identified is judged whether he is the same as one of the historical pedestrians according to the feature distance.

For example, let the pedestrian to be identified detected from the current video frame be a1. In the historical base, there are 16 historical pedestrians appearing in the video frames within 2 minutes before the shooting time of the current video frame. Among 16 people, 5 people are identified as pedestrian 1 (of which the corresponding ID is ID1), 5 people are identified as pedestrian 2 (the corresponding ID is ID2), and 6 people are identified as pedestrian 3 (the corresponding ID is ID3). It should be noted that, since the camera performs continuous shooting, the same pedestrian may appear in a plurality of video frames.

Table 1 shows the feature distances between the pedestrian a1 to be identified and each pedestrian 1 in the historical pedestrians.

TABLE 1

|    | ID1     | ID1     | ID1     | ID1    | ID1     |
|----|---------|---------|---------|--------|---------|
| a1 | 7.02946 | 6.72801 | 7.04967 | 7.2829 | 9.28402 |

Table 2 shows the feature distances between the pedestrian a1 to be identified and each pedestrian 2 in the historical pedestrians.

TABLE 2

|    | ID2     | ID2    | ID2     | ID2     | ID2     |
|----|---------|--------|---------|---------|---------|
| a1 | 19.9999 | 21.879 | 19.8341 | 24.1748 | 23.2484 |

Table 3 shows the feature distances between the pedestrian a1 to be identified and each pedestrian 3 in the historical pedestrians.

TABLE 3

|    | ID3     | ID3     | ID3     | ID3     | ID3      | ID3      |
|----|---------|---------|---------|---------|----------|----------|
| a1 | 2.97169 | 2.94814 | 4.43732 | 2.67215 | 15.59878 | 16.04216 |

Since the pedestrian a1 to be identified is actually the pedestrian 3, the feature distance between the pedestrian a1 to be identified and each pedestrian 3 in the historical pedestrians is small. Due to the change of factors such as the posture, the illumination and the shooting angle, the feature distance of the pedestrian a1 to be identified and the pedestrian marked as the pedestrian 3 in the historical pedestrians have sudden changes, as shown in table 3. In this case, the average value of the feature distances of the pedestrian a1 to be identified and the pedestrian in historical pedestrian marked as pedestrian 3 is:

(2.9716+2.94814+4.43732+2.67215+15.59878+ 16.04216)/6=7.445

If the preset distance threshold is 7.0, this result is significantly greater than the distance threshold. Furthermore, the average of the feature distances of the pedestrian a1 to be identified and the pedestrians 2 and the average of the feature distances of the pedestrian a1 to be identified and the pedestrians 3 also exceeds the distance threshold. Therefore the pedestrian a1 to be identified is regarded as a pedestrian different from the pedestrians 1, 2 and 3. In this case, a new pedestrian ID is assigned to the pedestrian a1 to be identified, resulting in failure of pedestrian re-identification.

To this end, the present disclosure provides a pedestrian re-identification scheme that can effectively suppress external noise interference and improve the success rate of pedestrian re-identification.

FIG. 1 is an exemplary flowchart of a pedestrian re-identification method according to one embodiment of the present disclosure. In some embodiments, the steps of the method of the present embodiment are performed by a pedestrian re-identification apparatus.

In step 101, a pedestrian to be identified in a preset video frame is detected.

In step 102, all pedestrians appearing in video frames shot in a preset time period before a shooting time of the preset video frame are extracted as historical pedestrians.

It should be noted here that an end time of the preset time period is the shooting time of the preset video frame. For example, a length of the preset time period is 2 minutes, and the end time of the preset time period is the shooting time of the preset video frame.

In step 103, a feature distance between the pedestrian to be identified and each historical pedestrian of the historical pedestrians are calculated.

In step 104, historical pedestrian IDs corresponding to a preset number of the feature distances are extracted in ascending order of the feature distances.

For example, in a historical base, there are 10 historical pedestrians identified as 6, there are 6 historical pedestrians identified as 7. In this embodiment, the pedestrian to be identified is assumed to be the pedestrian 6. Since the average value of the feature distances between other historical pedestrians in the historical base and the pedestrian to be identified is larger, the other historical pedestrians are not discussed here.

The average value of the feature distances between the pedestrian to be identified and historical pedestrians 6 is:

(7.18478+6.57366+6.71023+5.65011+4.6309+ 3.73646+

5.03583+3.01242+1.57515+1.66077)/10=4.57703

The average of the feature distances of the pedestrian to be identified and the historical pedestrians 7 is:

(3.7303+2.37949+3.94587+4.21519+5.34866+ 6.1209)/6=4.29007

The feature distance between the pedestrian to be identified and the historical pedestrians 7 is smaller because the features are disturbed, therefore the pedestrian to be identified is re-identified as the pedestrian 7.

To this end, the present disclosure performs an overall analysis of the feature distances.

In some embodiments, as shown in table 4, historical pedestrian IDs corresponding to the first 5 feature distances are extracted from the feature distances between the pedestrian to be identified and each of the pedestrians 6 and each of the pedestrians 7 in the order from small feature distances to large feature distances.

TABLE 4

| Feature distance value | Historical pedestrian ID |
|------------------------|--------------------------|
| 1.57515                | ID6                      |
| 1.66077                | ID6                      |
| 2.37949                | ID7                      |
| 3.01242                | ID6                      |
| 3.7303                 | ID7                      |

In step 105, the historical pedestrian IDs are clustered to re-identify the pedestrian to be identified.

In some embodiments, the historical pedestrian IDs are clustered to classify same historical pedestrian IDs into a same cluster set. A number of historical pedestrian IDs in each cluster set is counted, and a historical pedestrian ID in a cluster set with the maximum number of historical pedestrian IDs is taken as an ID of the pedestrian to be identified.

As shown in TABLE 4, the historical pedestrian IDs are divided into 2 sets by clustering. The first set corresponds to historical pedestrian 6, and includes 3 historical pedestrian IDs. The second set corresponds to historical pedestrian 7, and includes 2 historical pedestrian IDs. In this case, the historical pedestrian ID 6 involved in the first set is assigned to the pedestrian to be identified. That is, the identity of the pedestrian to be identified is determined as the historical pedestrian 6 according to the above-described processing.

In the pedestrian re-identification method provided by the above embodiments, by performing an integral analysis of the feature distances of the pedestrians to be identified and the historical pedestrians, the external noise interference can be effectively suppressed, and the success rate of pedestrian re-identification is improved.

Figure 2:
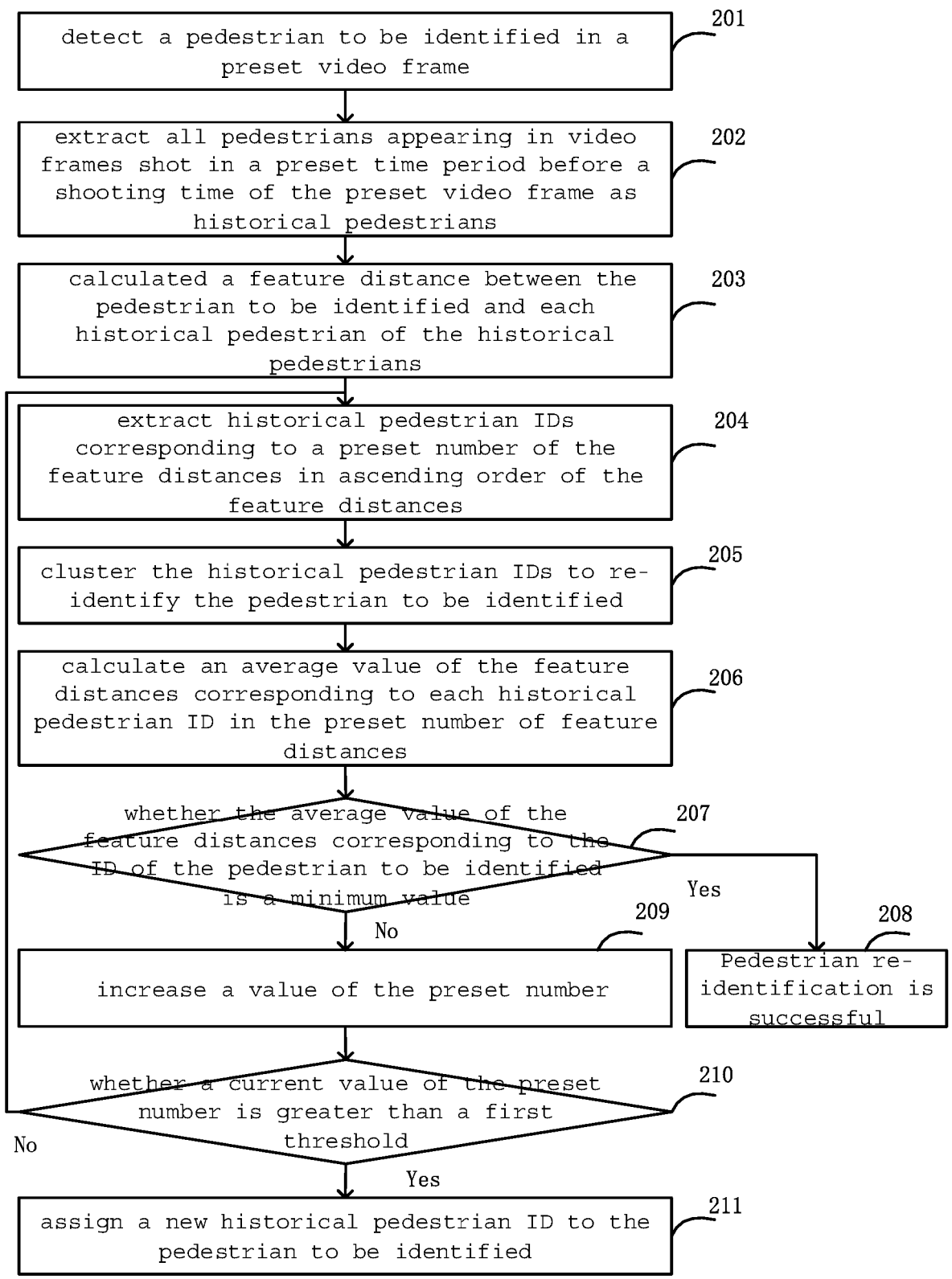
FIG. 2 is an exemplary flowchart of a pedestrian re-identification method according to another embodiment of the present disclosure.

FIG. 2 is an exemplary flowchart of a pedestrian re-identification method according to another embodiment of the present disclosure. In some embodiments, the steps of the method of the present embodiment are performed by a pedestrian re-identification apparatus. Steps 201-205 are the same as the steps 101-105 in the above embodiment.

In step 201, a pedestrian to be identified in a preset video frame is detected.

In step 202, all pedestrians appearing in video frames shot in a preset time period before a shooting time of the preset video frame are extracted as historical pedestrians.

In step 203, a feature distance between the pedestrian to be identified and each historical pedestrian of the historical pedestrians are calculated.

In step 204, historical pedestrian IDs corresponding to a preset number of the feature distances are extracted in ascending order of the feature distances.

In step 205, the historical pedestrian IDs are clustered to re-identify the pedestrian to be identified.

In step 206, an average value of the feature distances corresponding to each historical pedestrian ID in the preset number of feature distances is calculated.

In step 207, it is judged whether the average value of the feature distances corresponding to the ID of the pedestrian to be identified is a minimum value according to a calculating result.

Under a condition that the average value of the feature distances corresponding to the ID of the pedestrian to be identified is the minimum value, a step 208 is performed. Under a condition that the average value of the feature distances corresponding to the ID of the pedestrian to be identified is not the minimum value, a step 209 is performed.

In step 208, the ID of the pedestrian to be identified is determined to be matched with the pedestrian to be identified, confirming the re-identification of the pedestrian is successful.

As shown in TABLE 4, the average of the 3 feature distances corresponding to the historical pedestrian ID6 is:

$$(1.57515+1.66077+3.01242)/3=2.08278$$

The average of the 2 feature distances corresponding to the historical pedestrian ID7 is:

$$(2.37949+3.7303)/2=3.054895$$

Since the average value of the feature distances corresponding to the historical pedestrian ID6 is the minimum, the ID assigned to the pedestrian to be identified is also ID6, thereby indicating that the pedestrian re-identification was successful.

In step 209, a value of the preset number is increased.

In step 210, it is judged whether a current value of the preset number is greater than a first threshold.

Under a condition that the current value of the preset number is not larger than the first threshold, the step 204 is performed, under a condition that the current value of the preset number is larger than the first threshold, a step 211 is performed.

At step 211, a new historical pedestrian ID is assigned to the pedestrian to be identified.

In the above embodiment, if the historical pedestrian ID assigned to the pedestrian to be identified is ID6, the average value of feature distances corresponding to the historical pedestrian ID7 is the smallest, which means that the pedestrian re-identification was not successful. In this case, by increasing the value of the preset number N, more historical samples can be used in the process of re-performing the identification process. For example, the value of N may be doubled.

In the above embodiment, if a successful result of re-identifying the pedestrian cannot be obtained under a condition that the preset number N exceeds the first threshold by adjusting the preset number N, it is determined that the pedestrian to be identified is not included in the historical pedestrians. In this case, a new historical pedestrian ID is assigned to the pedestrian to be identified.

In some embodiments, after the step 203, a number of feature distances corresponding to the each historical pedestrian ID is counted. It is judged whether a counting result exceeds a second threshold. Under a condition that the counting result exceeds the second threshold, a maximum feature distance in the feature distances corresponding to the each historical pedestrian ID is deleted, and then step 204 is performed. Under a condition that the counting result does not exceed the second threshold, the pedestrian re-identification processing is directly carried out by using the obtained feature distance.

For example, a pedestrian loiters in a certain area, there is more information with the same historical pedestrian ID in the historical base for a certain period of time. Since the pedestrian posture, the illumination, the shooting angle, and the like are different, the feature distances may be greatly deviated. By deleting the maximum feature distance in the corresponding feature distances, the external noise can be effectively filtered.

In some embodiments, if the pedestrian to be identified is a historical pedestrian 6, there are 21 pieces of information corresponding to the historical pedestrian ID6 in the historical base, which exceeds a preset threshold (e.g., the preset threshold is 20 pieces). In this case, among the feature distances between the pedestrian to be identified and the historical pedestrian ID6, the feature distance with the largest value is deleted, and the remaining 20 feature distances are used for corresponding processing, thereby effectively eliminating external noise interference.

Figure 3:
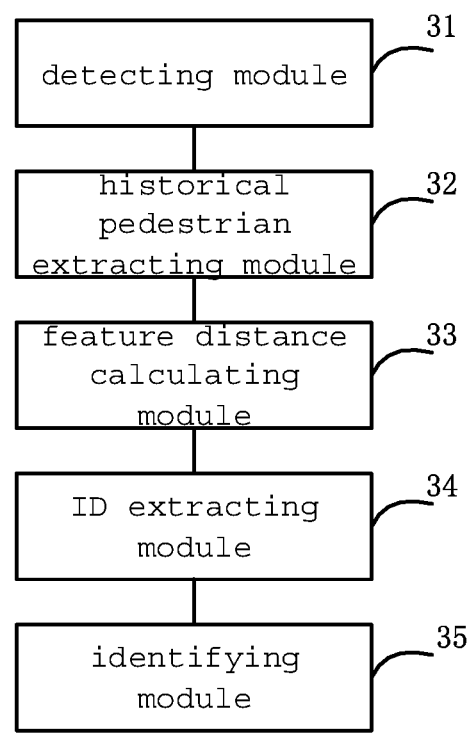
FIG. 3 is an exemplary block diagram of a pedestrian re-identification apparatus of one embodiment of the present disclosure.

FIG. 3 is an exemplary block diagram of a pedestrian re-identification apparatus according to an embodiment of the present disclosure. As shown in FIG. 3, the pedestrian re-identification apparatus includes a detecting module 31, a historical pedestrian extracting module 32, a feature distance calculating module 33, an ID extracting module 34, and an identifying module 35.

As shown in FIG. 3, the detecting module 31 is configured to detect a pedestrian to be identified in a preset video frame.

The historical pedestrian extracting module 32 is configured to extract all pedestrians appearing in video frames shot in a preset time period before a shooting time of the preset video frame as historical pedestrians. An end time of the preset time period is the shooting time of the preset video frame.

In some embodiments, the preset time period is 2 minutes. An end time of the preset time period is the shooting time of the preset video frame.

The feature distance calculating module 33 is configured to calculate a feature distance between the pedestrian to be identified and each historical pedestrian of the historical pedestrians.

The identification extracting module 34 is configured to extract historical pedestrian IDs corresponding to a preset number of the feature distances in ascending order of the feature distances.

The identifying module 35 is configured to cluster the historical pedestrian IDs to re-identify the pedestrian to be identified.

In some embodiments, the identifying module 35 is configured to cluster the historical pedestrian IDs to classify same historical pedestrian IDs into a same cluster set, count a number of historical pedestrian IDs in each cluster set, and take a historical pedestrian ID in a cluster set with the maximum number of historical pedestrian IDs as an ID of the pedestrian to be identified.

In some embodiments, as shown in TABLE 4, the historical pedestrian IDs are divided into 2 sets by clustering. The first set corresponds to historical pedestrian 6, and includes 3 historical pedestrian IDs. The second set corresponds to historical pedestrian 7, and includes 2 historical pedestrian IDs. In this case, the historical pedestrian ID 6 involved in the first set is assigned to the pedestrian to be identified. That is, the identity of the pedestrian to be identified is determined as the historical pedestrian 6 according to the above-described processing.

In the pedestrian re-identification apparatus provided by the above embodiments of the disclosure, by performing an integral analysis of the feature distances of the pedestrians to be identified and the historical pedestrians, the external noise interference can be effectively suppressed, and the success rate of pedestrian re-identification is improved.

Figure 4:
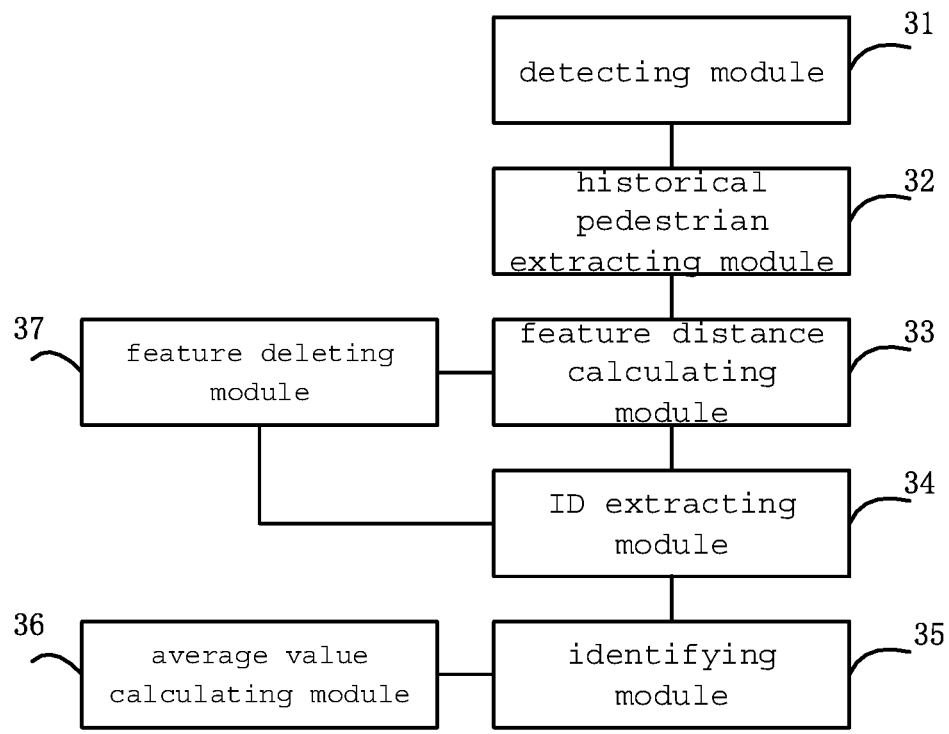
FIG. 4 is an exemplary block diagram of a pedestrian re-identification apparatus of another embodiment of the present disclosure.

FIG. 4 is an exemplary block diagram of a pedestrian re-identification apparatus according to another embodiment of the present disclosure. FIG. 4 differs from FIG. 3 in that, in the embodiment shown in FIG. 4, the pedestrian re-identification apparatus further includes an average value calculating module 36.

As shown in FIG. 4, the average value calculating module 36 is configured to calculate an average value of the feature distances corresponding to each historical pedestrian ID in the preset number of feature distances after the identification module 35 identifies the pedestrian to be identified according to the clustering result.

The identifying module 35 is further configured to judge whether the average value of the feature distances corresponding to the ID of the pedestrian to be identified is a minimum value according to a calculating result according to the calculation result of the average value calculating module 36, and determine the ID of the pedestrian to be identified is matched with the pedestrian to be identified under a condition that the average value of the feature distances corresponding to the ID of the pedestrian to be identified is the minimum value.

In some embodiments, as shown in TABLE 4, the average value of 3 feature distances corresponding to historical pedestrian ID6 is 2.08278, and the average value of 2 feature distances corresponding to historical pedestrian ID7 is 3.054895. Since the average value of the feature distances corresponding to the historical pedestrian ID6 is the minimum, the ID assigned to the pedestrian to be identified is also ID6, which means that the pedestrian re-identification was successful.

In some embodiments, the identifying module 35 is further configured to increase a value of the preset number under a condition that the average value of the feature distances corresponding to the ID of the pedestrian to be identified is not the minimum value, judge whether a current value of the preset number is greater than a first threshold, and instructs the identification extracting module 34 to perform an operation of extracting the historical pedestrian IDs corresponding to the preset number of the feature distances in ascending order of the feature distances under a condition that the current value of the preset number is not larger than the first threshold.

In some embodiments, the identifying module 35 is further configured to assign a new historical pedestrian ID to the pedestrian to be identified under a condition that the current value of the preset number is greater than the first threshold.

For example, if the re-identification of the pedestrian is not successful, the value of the preset number is further increased to select more historical samples for identification. If the scale of samples is enlarged, and the pedestrian re-identification still cannot be successfully realized under the condition that the sample number exceeds the first threshold, which means that the pedestrian to be identified is not included in the historical pedestrians. In this case, a new historical pedestrian ID is assigned to the pedestrian to be identified.

In some embodiments, as shown in FIG. 4, the pedestrian re-identification apparatus further comprises a feature deleting module 37.

The feature deleting module 37 is configured to count a number of feature distances corresponding to the each historical pedestrian ID after calculating a feature distance between the pedestrian to be identified and the each historical pedestrian of the historical pedestrians, judge whether a counting result exceeds a second threshold, delete a maximum feature distance in the feature distances corresponding to the each historical pedestrian ID under a condition that the counting result exceeds the second threshold; and instructs the ID extracting module 34 to perform an operation of extracting historical pedestrian IDs corresponding to a preset number of the feature distances in ascending order of the feature distances.

For example, a pedestrian loiters in a certain area, there is more information with the same historical pedestrian ID in the historical base for a certain period of time. Since the pedestrian posture, the illumination, the shooting angle, and the like are different, the feature distances may be greatly deviated. By deleting the maximum feature distance in the corresponding feature distances, the external noise can be effectively filtered.

In some embodiments, if the pedestrian to be identified is a historical pedestrian 6, there are 21 pieces of information corresponding to the historical pedestrian ID6 in the historical base, which exceeds a preset threshold (e.g., the preset threshold is 20 pieces). In this case, among the feature distances between the pedestrian to be identified and the historical pedestrian ID6, the feature distance with the largest value is deleted, and the remaining 20 feature distances are used for corresponding processing, thereby effectively eliminating external noise interference.

Figure 5:
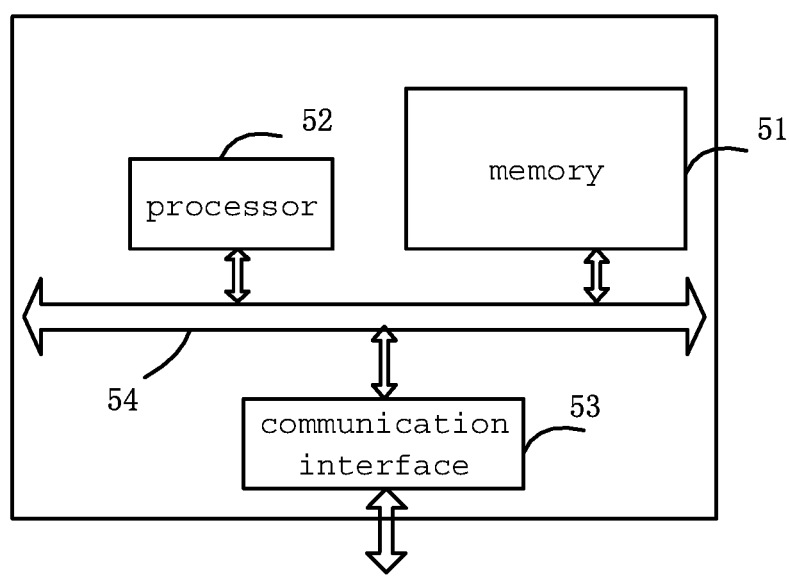
FIG. 5 is an exemplary block diagram of a pedestrian re-identification apparatus according to still another embodiment of the present disclosure.

FIG. 5 is an exemplary block diagram of a pedestrian re-identification apparatus according to still another embodiment of the present disclosure. As shown in FIG. 5, the pedestrian re-identification apparatus includes a memory 51 and a processor 52.

The memory 51 is used for storing instructions, the processor 52 is coupled to the memory 51, and the processor 52 is configured to execute the method according to any one of the embodiments in FIG. 1 or FIG. 2 based on the instructions stored in the memory.

As shown in FIG. 5, the pedestrian re-identification apparatus further includes a communication interface 53 for information interaction with other devices. Meanwhile, the device also comprises a bus 54, and the processor 52, the communication interface 53 and the memory 51 are communicated with each other through the bus 54.

The memory 51 may comprise high-speed RAM memory, and may also include non-volatile memory, such as at least one disk memory. The memory 51 may also be a memory array. The storage 51 may also be partitioned and the blocks may be combined into virtual volumes according to certain rules.

Further, the processor 52 may be a central processing unit CPU, or may be an application specific integrated circuit ASIC, or one or more integrated circuits configured to implement embodiments of the present disclosure.

The present disclosure also relates to a non-transitory computer-readable storage medium, wherein the computer-readable storage medium stores computer instructions, and the instructions, when executed by a processor, implement the method according to any one of the embodiments in FIG. 1 or FIG. 2.

In some embodiments, the functional unit modules described above can be implemented as a general purpose Processor, a Programmable Logic Controller (PLC), a Digital Signal Processor (Digital Signal Processor, DSP), an Application Specific Integrated Circuit (ASIC), a Field Programmable Gate Array (FPGA) or other Programmable Logic device, discrete Gate or transistor Logic, discrete hardware components, or any suitable combination thereof for performing the functions described in this disclosure.

It will be understood by those skilled in the art that all or part of the steps for implementing the above embodiments may be implemented by hardware, or may be implemented by a program instructing relevant hardware, where the program may be stored in a computer-readable storage medium, and the storage medium may be a read-only memory, a magnetic disk or an optical disk.

The description of the present disclosure has been presented for purposes of illustration and description, and is not intended to be exhaustive or limited to the disclosure in the form disclosed. Many modifications and variations will be apparent to practitioners skilled in this art. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A pedestrian re-identification method, comprising:
    detecting a pedestrian to be identified in a preset video frame;
    extracting all pedestrians appearing in video frames shot in a preset time period before a shooting time of the preset video frame as historical pedestrians, wherein an end time of the preset time period is the shooting time of the preset video frame;
    calculating a feature distance between the pedestrian to be identified and each historical pedestrian of the historical pedestrians;
    extracting historical pedestrian IDs corresponding to a preset number of the feature distances in ascending order of the feature distances;
    clustering the historical pedestrian IDs to classify same historical pedestrian IDs into a same cluster set;
    counting a number of historical pedestrian IDs in each cluster set; and
    taking a historical pedestrian ID in a cluster set with the maximum number of historical pedestrian IDs as an ID of the pedestrian to be identified, to re-identify the pedestrian to be identified.

2. The pedestrian re-identification method according to claim 1, further comprising:
    calculating an average value of the feature distances corresponding to each historical pedestrian ID in the preset number of feature distances after re-identifying the pedestrian to be identified;
    judging whether an average value of feature distances corresponding to the ID of the pedestrian to be identified is a minimum value according to a calculating result; and
    determining the ID of the pedestrian to be identified is matched with the pedestrian to be identified under a condition that the average value of the feature distances corresponding to the ID of the pedestrian to be identified is the minimum value.

3. The pedestrian re-identification method according to claim 2, further comprising:
    increasing a value of the preset number under a condition that the average value of the feature distances corresponding to the ID of the pedestrian to be identified is not the minimum value;
    judging whether a current value of the preset number is greater than a first threshold; and
    executing a step of extracting the historical pedestrian IDs corresponding to the preset number of the feature distances in ascending order of the feature distances under a condition that the current value of the preset number is not larger than the first threshold.

4. The pedestrian re-identification method according to claim 3, further comprising:
    assigning a new historical pedestrian ID to the pedestrian to be identified under a condition that the current value of the preset number is greater than the first threshold.

5. The pedestrian re-identification method according to claim 1, further comprising:
    counting a number of feature distances corresponding to the each historical pedestrian ID after calculating the feature distance between the pedestrian to be identified and the each historical pedestrian of the historical pedestrians;
    judging whether a counting result exceeds a second threshold;
    deleting a maximum feature distance in the feature distances corresponding to the each historical pedestrian ID under a condition that the counting result exceeds the second threshold; and
    executing a step of extracting historical pedestrian IDs corresponding to a preset number of the feature distances in ascending order of the feature distances.

6. A non-transitory computer readable storage medium, wherein the computer readable storage medium stores computer instructions which, when executed by a processor, implement the method of claim 1.

7. A pedestrian re-identification apparatus, comprising:
    a processor; and
    a memory coupled to the processor, storing program instructions which, when executed by the processor, cause the processor to:
    detect a pedestrian to be identified in a preset video frame;
    extract all pedestrians appearing in video frames shot in a preset time period before a shooting time of the preset video frame as historical pedestrians, wherein an end time of the preset time period is the shooting time of the preset video frame;
    calculate a feature distance between the pedestrian to be identified and each historical pedestrian of the historical pedestrians;
    extract historical pedestrian IDs corresponding to a preset number of the feature distances in ascending order of the feature distances;
    cluster the historical pedestrian IDs to classify same historical pedestrian IDs into a same cluster set;

count a number of historical pedestrian IDs in each cluster set; and take a historical pedestrian ID in a cluster set with the maximum number of historical pedestrian IDs as an ID of the pedestrian to be identified, to re-identify the pedestrian to be identified.

8. The pedestrian re-identification apparatus according to claim 7, wherein the instructions further cause the processor to:

calculate an average value of the feature distances corresponding to each historical pedestrian ID in the preset number of feature distances after re-identifying the pedestrian to be identified;

judge whether an average value of feature distances corresponding to the ID of the pedestrian to be identified is a minimum value according to a calculating result; and determine the ID of the pedestrian to be identified is matched with the pedestrian to be identified under a condition that the average value of the feature distances corresponding to the ID of the pedestrian to be identified is the minimum value.

9. The pedestrian re-identification apparatus according to claim 8, wherein the instructions further cause the processor to:

increase a value of the preset number wider a condition that the average value of the feature distances corresponding to the ID of the pedestrian to be identified is not the minimum value;

judge whether a current value of the preset number is greater than a first threshold; and execute a step of extracting the historical pedestrian IDs corresponding to the preset number of the feature distances in ascending order of the feature distances under a condition that the current value of the preset number is not larger than the first threshold.

10. The pedestrian re-identification apparatus according to claim 9, wherein the instructions further cause the processor to:

assign a new historical pedestrian ID to the pedestrian to be identified under a condition that the current value of the preset number is greater than the first threshold.

11. The pedestrian re-identification apparatus according to claim 7, wherein the instructions further cause the processor to:

count a number of feature distances corresponding to the each historical pedestrian ID after calculating a feature distance between the pedestrian to be identified and the each historical pedestrian of the historical pedestrians;

judge whether a counting result exceeds a second threshold;

delete a maximum feature distance in the feature distances corresponding to the each historical pedestrian ID under a condition that the counting result exceeds the second threshold; and execute a step of extracting historical pedestrian IDs corresponding to a preset number of the feature distances in ascending order of the feature distances.

* * * * *